Sept. 22, 1970 T. G. SEIFERT 3,529,829

PLAYING CARD DISTRIBUTION DEVICE

Filed Aug. 26, 1968 3 Sheets-Sheet 1

INVENTOR.
THOMAS G. SEIFERT

BY

Dunlap and Laney
ATTORNEYS

Sept. 22, 1970 T. G. SEIFERT 3,529,829

PLAYING CARD DISTRIBUTION DEVICE

Filed Aug. 26, 1968 3 Sheets-Sheet 2

INVENTOR.
THOMAS G. SEIFERT

BY

ATTORNEYS

PLAYING CARD DISTRIBUTION DEVICE

Filed Aug. 26, 1968 3 Sheets-Sheet 3

INVENTOR.
THOMAS G. SEIFERT
BY
Dunlap, Laney & Hessin
ATTORNEYS

United States Patent Office 3,529,829
Patented Sept. 22, 1970

3,529,829
PLAYING CARD DISTRIBUTION DEVICE
Thomas G. Seifert, 833 NW. 33rd,
Oklahoma City, Okla. 73118
Continuation-in-part of application Ser. No. 614,065, Feb. 7, 1967. This application Aug. 26, 1968, Ser. No. 767,017
Int. Cl. B07c *5/344;* A63f *1/14*
U.S. Cl. 273—149 11 Claims

ABSTRACT OF THE DISCLOSURE

A playing card sorting apparatus which employs a master card indicative of particular hand distribution and individually coded playing cards, the apparatus consisting of electric circuitry which is preconditioned by the master card to enable selected card hand distribution indications for each playing card. The circuitry includes a separate power source for each card suit, each suit circuit being routed to parallel indicators each denoting a card suit and the master card enables a particular suit and hand indicator for a given card rank as determined from sensing of coded indicia on the particular playing card.

CROSS-REFERENCE TO COPENDING APPLICATION

This application is a continuation-in-part of U.S. patent application Ser. No. 614,065 entitled, "Playing Card Distribution System," and filed on Feb. 7, 1967, in the name of the present patentee, and now abandoned.

BACKGROUND OF THE INVENTION

This invention relates generally to improvements in card dealing apparatus and, more particularly, but not by way of limitation, to an improved card sorting apparatus which serves to indicate predetermined hand distribution for each card of a playing card deck, such dealing apparatus finding particular application in bridge hand dealing.

SUMMARY OF THE INVENTION

The present invention contemplates a card dealing apparatus which can be operated to rapidly sense coded indicia on each individual ones of a playing card deck to derive an indication of their proper hand distribution. In its more limited aspects, the invention contemplates electrical sensing apparatus which utilizes separate power sources for each card suit, each of which sources are connected to a plurality of indicators each representative of a card hand; the indicators are each series connected to terminate in one of a parallel arrangement of conductive bars which contact a matrix panel. An additional contactor panel disposed adjacent the parallel conductive bars and matrix panel makes a plurality of contacts in accordance with a coded master card which is inserted therebetween, and the selection circuit is completed unidirectionally via the contactor panel and the return side of a selected card suit power source in accordance with a circuit contact enabled by coded indicia on the particular playing card.

Therefore, it is an object of the invention to provide a card dealing apparatus which is of simplified construction and can be manufactured with less expensive materials and procedures.

It is also an object of this invention to provide card dealing apparatus which is particularly suited for dealing bridge hands of predetermined composition.

It is a further object of the present invention to provide card dealing device utilizing a plurality of separate power sources, one for each card suit, such that a necessity for card suit switching is obviated and a less complex playing card code is required.

Finally, it is an object of this invention to provide card dealing apparatus which is light, compact and easily operated in that the motions of manipulation are essentially those employed in normal manual dealing procedure.

Other objects and advantages of the invention will be evident from the following detailed description when read in conjunction with the accompanying drawings which illustrate the invention.

DESCRIPTION OF THE PREFERRED EMBODIMENT

Figure 1:
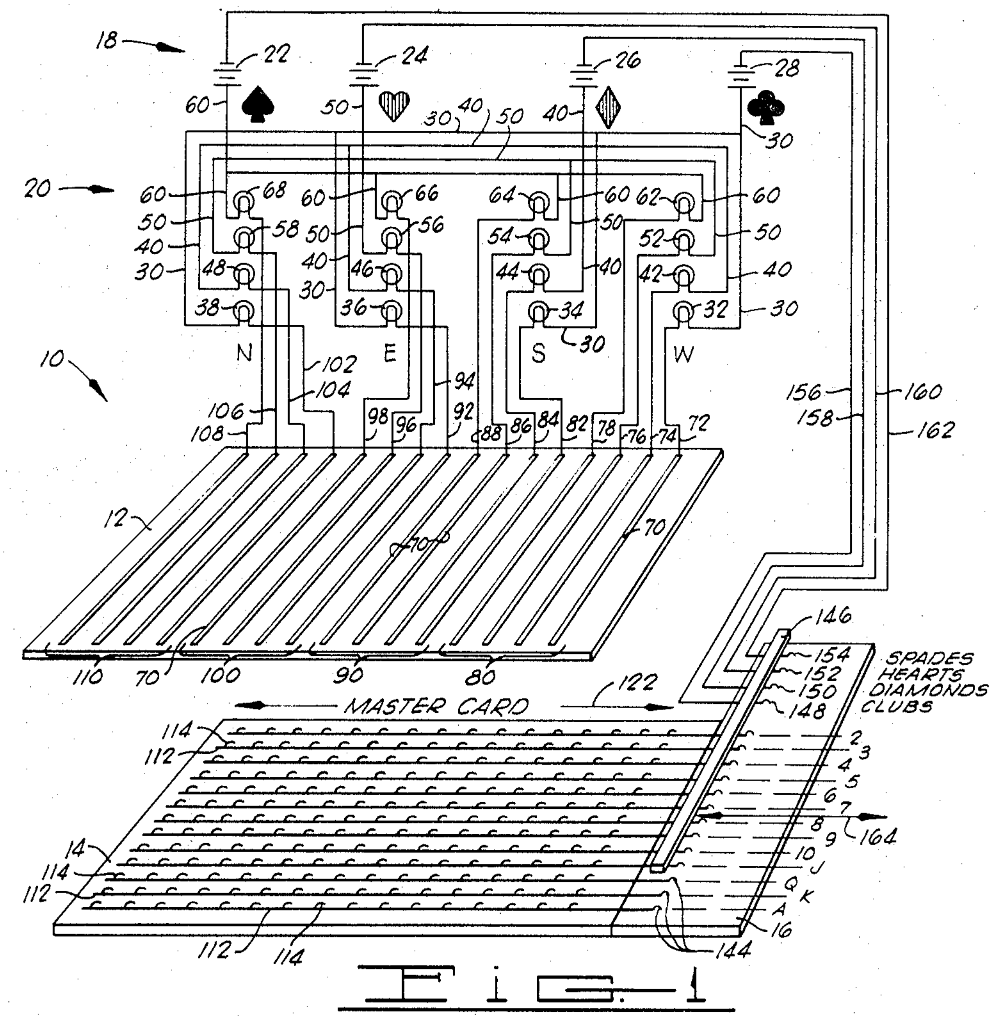
FIG. 1 is a pictorial schematic diagram of the electrical circuitry of the invention.

Referring now to FIG. 1, an electrical sensing apparatus 10 is comprised of a buss matrix panel 12, a contactor panel 14 and a sensor panel 16, which, with the aid of a coded master card and a coded playing card (to be described), perform the selection of a predetermined card suit power source 18 to illuminate one of lamps 20 indicative of a card hand which should receive the particular coded playing card. The following description proceeds with reference to bridge hand dealing wherein four predetermined hands are sorted but it should be understood that the apparatus may be programmed for any card game and any number of hands.

The power sources 18 consist of four separate batteries 22, 24, 26 and 28, e.g., standard flashlight dry cells, representative of spades, hearts, diamonds and clubs respectively. In turn, each of suit batteries 22, 24, 26 and 28 are connected in parallel to an indicator 20 representative of each game hand, i.e., West, South, East or North, namely; club battery 28 is connected for output on lead 30 which makes parallel connection to West indicator 32, South indicator 34, East indicator 36 and North indicator 38; similarly, diamonds battery 26 is conducted via lead 40 to West lamp 42, South lamp 44, East lamp 46, and North lamp 48; heart battery 24 is connected via lead 50 to each of West lamp 52, South lamp 54, East lamp 56 and North lamp 58; while, finally, spades battery 22 is connected via leads 60 to the respective West lamp 62, South lamp 64, East lamp 66 and North lamp 68.

Figure 7:
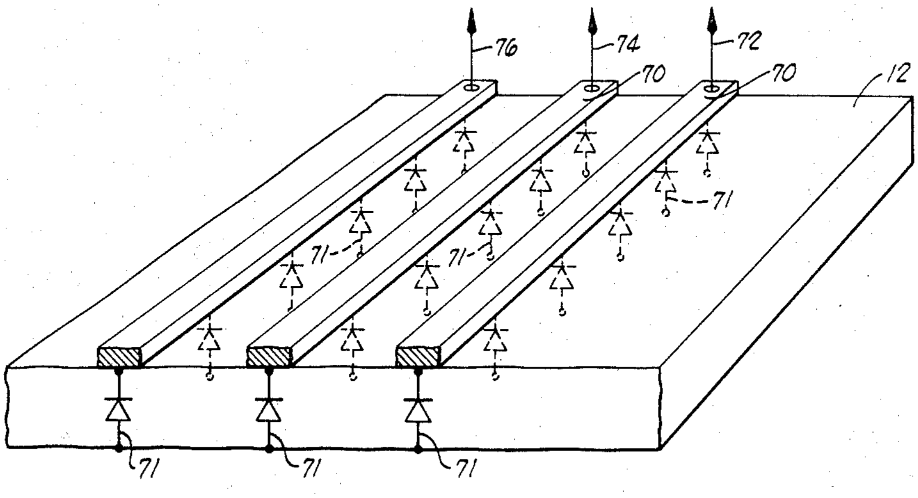
FIG. 7 is an enlarged cross section of a portion of the buss matrix.

Each of the indicators 20 is then connected to consecutive ones of a plurality of conductor bars 70 which are supported in parallel relationship on the buss matrix panel 12. Buss matrix panel 12 may be formed from any suitable insulative material to carry the conductor bars 70 in contact with a plurality of rectifiers 71 as shown in FIG. 7. It should be understood that in the present pictorial showing (FIG. 1) each of the conductor bars 70 would be conductively coupled to each of a plurality of rectifying components 71 which are respectively arranged for electrical connection with predetermined contacts on the contactor panel 14 as will be described. It is important that the current flow through each of conductor bars 70 be maintained unidirectional to avoid sneak circuits in parallel to desired recognition circuits. This may be effected in various ways as will be further described.

There are sixteen of the conductor bars 70 arranged in parallel and in electrical connection to each of the indicators 20. That is, the West lamps 32, 42, 52, and 62 are connected via leads 72, 74, 76 and 78 to a first four-bar group 80 of conductor bars 70. Similarly, South lamps 34, 44, 54, and 64 are connected via respective leads 82, 84, 86 and 88 to a four-bar group 90, East lamps 36, 46, 56 and 66 are connected via leads 92, 94, 96 and 98 to a third four-bar group 100, while the North lamps 38, 48, 58 and 68 are connected via leads 102, 104, 106, and 108 to the fourth four-bar group 110 of the conductor bars 70.

The contactor panel 14 is formed of insulative material and in similar rectangular dimension to buss matrix panel 12. Panel 14 is operatively disposed in register with buss matrix panel 12 as it bears a plurality of contactor strips 112 which are disposed parallel to each other and at right angles to the parallel lay of conductor bars 70 of buss matrix panel 12. The contactor panel 14 carries thirteen contactor strips 112, one for each card rank, deuce through ace as designated, and each contactor strip 112 has a plurality of evenly spaced contactors 114 formed thereon. Actually, each strip 112 has sixteen evenly spaced contacts 114, similar contacts 114 on each of contactor strips 112 being disposed in a straight line across the contactor panel 14 to make contact with a predetermined one of rectifiers 71 on conductor bars 70 of buss matrix panel 12.

Figure 3:
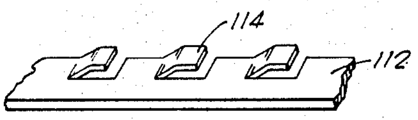
FIG. 3 is an enlarged perspective view of one form of contactor which may be employed in the circuitry of FIG. 1.

FIG. 3 shows an enlarged view of a portion of one form of contactor strip 112 as it may be formed to support the numerous, evenly spaced contacts 114 therealong. This is a conventional type of stamped contactor construction which may be formed out of suitable conductive spring metal, i.e., beryllium-copper or such. The uppermost of contacting surface of contacts 114 may be rounded, smoothed or whatever to provide maximum efficiency of contacting through the coded master card, to be further described below. It is also contemplated that contactor strip 112 may take the form of a continuous length of selected wire material having desirable resilience characteristics; the wire being bent to have a series of undulations or spring-finger contacts along its length. This and still other forms of contactor element are readily usable in a device constructed in accordance with the invention.

Figure 2:
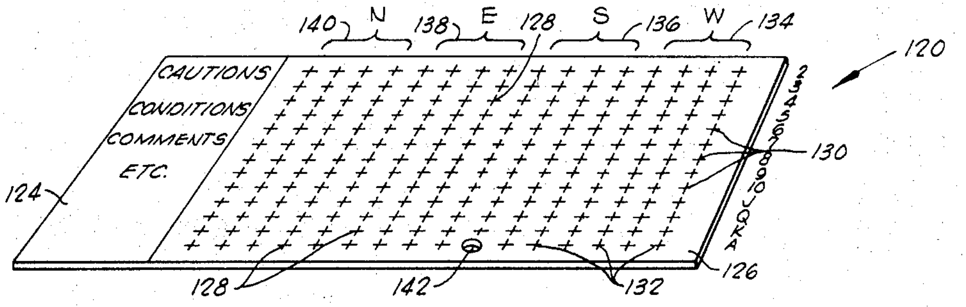
FIG. 2 is a perspective view of a master card as employed in the invention.

Referring now to FIG. 2, a master card 120 may be disposed along arrow 122 (FIG. 1), between buss matrix panel 12 and contactor panel 14, to control the selective actuation or contacting therebetween in a predetermined manner. A first portion 124 of master card 120 may merely contain printed matter conveying comments pertinent to the particular card hands. That is, expert or such commentary as to the bidding, vulnerability, remarks as to strategy and playing, etc. A second portion 126 of master card 120 is formed to have similar rectangular dimensions as the buss panel 12 and contactor panel 14 and serves to control electrical contacting therebetween.

The master card portion 126 contains two hundred and eight (208) symmetrically arranged locations 128 formed as thirteen rows 130 of sixteen columns 132. Thus, four columns 132 are disposed in consecutive order for each of the West, South, East and North player or hand positions. Each of the hand position four-column groups 134, 136, 138 and 140 includes fifty-two locations which may be punched out or otherwise made actuable for each playing card of the fifty-two card deck so that each is assigned to the predetermined game hand, i.e., North, East, South or West. One location 128 is shown as a punch-out location 142 which denotes an ace of hearts in the South playing hand (as will be further described), and it should be understood that for a given bridge hand distribution, fifty-two such punch-out locations 142 will be situated on master card portion 126, thirteen in each of the hand groups 134, 136, 138 and 140.

When the master card 120 is inserted between buss matrix panel 12 and contactor panel 14 (as along arrow 122) a predetermined fifty-two of the two hundred and eight contactors 114 will be allowed to make unidirectional electrical contact with selected rectifiers 71 connected to respective ones of the sixteen conductor bars 70 thereby to complete circuits which are characteristic of a particular bridge hand. In the actual design of components, the master card 120 may be made to slide between buss matrix panel 12 and contactor panel 14, each disposed in registry and narrowly spaced, or it is contemplated that a folding arrangement may be preferable wherein master card 120 is placed down upon contactor panel 14 whereupon buss matrix panel 12 is hingedly closed over master card 120 and locked in contacting relationship. There are of course many other design possibilities which lend themselves for adaptation to the particular electrical coding arrangement.

The sensor panel 16 supports a plurality of linear and evenly spaced contacts 144. There are thirteen such contacts 144, one for each card rank, deuce through ace, and each one is electrically connected to one of contactor strips 112 of contactor panel 14. The contacts 144 may be formed as an extension of the respective contactor strips 112 (as shown in FIG. 1) or the contactor panel 14 and sensor panel 16 may be separated with a separate wire connection provided to each of contacts 144. Selected ones of contacts 144 make contact with a shorting bar 146 disposed parallel to and with narrow spacing from the row of contacts 144. The selection of circuit contacts is controlled by the coded playing card as will be further described.

Four additional contacts 148, also arranged in a row and narrowly spaced from shorting bar 146, provide circuit return via the respective wires 156, 158, 160 and 162 to the respective clubs, diamonds, hearts and spades batteries 28, 26, 24 and 22. Thus, insertion of the coded playing card along arrow 164 between sensor panel 16 and shorting bar 126 will complete a circuit in accordance with the playing card rank and suit. That is, one of leads 156, 158, 162 or 160 will be completed through one of contacts 148, 150, 152 and 154 and one of contacts 144 to an associated contactor strip 12. This, of course, is in accordance with the actual rang and suit of the playing card as conveyed by its code indicia. It is contemplated that shorting bar 146 be controlled as to vertical disposition such that it can be manipulated into contacting attitude during preselected times only, thus avoiding continual energization of the indicators 20.

Figure 4:
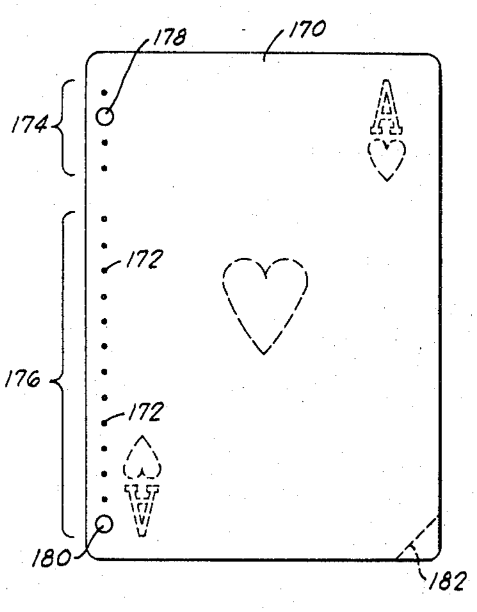
FIG. 4 illustrates one form of playing card coding arrangement which may be employed with the electrical sensing apparatus of FIG. 1.

FIG. 4 shows a playing card 170, the ace of hearts, which is depicted face down and bears one form of coding indicia. Seventeen locations 172, a suit group 174 and a card rank group 176, are disposed in a line along the left edge of playing card 170. One location of each of suit group 174 and rank group 176 may be punched in accordance with the playing card rank and suit so that shorting bar 146 will complete a circuit from the proper suit contact 148, 150, 152 or 154 through the proper one of rank contacts 144 to a contactor 112 of contactor panel 114, these also being indicative of card rank. In FIG. 4 code holes 178 and 180 are punched to represent the ace of hearts as will be further described below. It is contemplated that one corner of playing card 170 can be cut off or otherwise notched as at dash line 182 to provide uniform stacking of the deck prior to the repetitive insertion of each card for its code reading.

Figure 5:
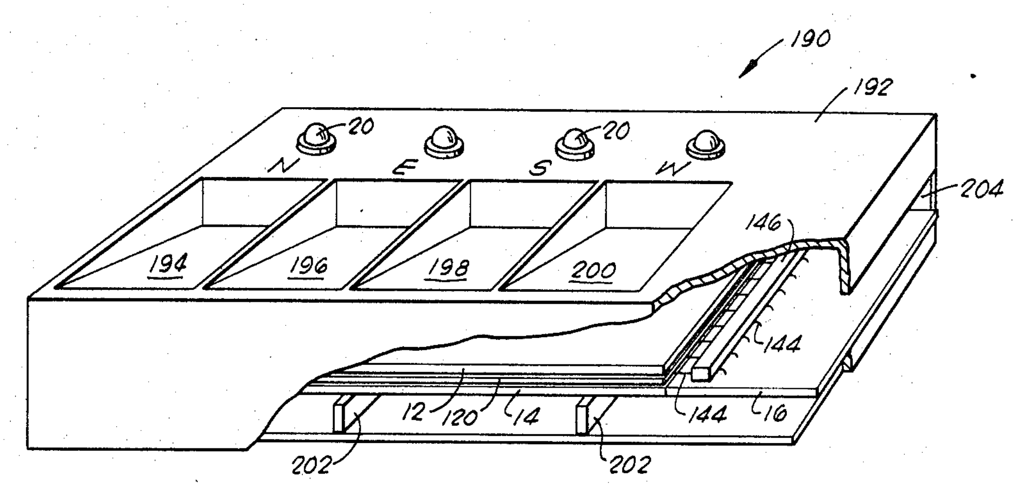
FIG. 5 is a partially cutaway perspective view of an exemplary form of functional encasement which might be utilized in the present invention.

FIG. 5 illustrates one form of container or housing 190 which may be utilized with the circuitry of FIG. 1. A rectangular casing 192 may be formed or molded from plastic or such to have four depressions 194, 196, 198 and 200 which serve as hand depositories and receive the cards as they are sensed. Each of the hand depressions, 194–200 has its respective North, East, South and West indicators 20 disposed in adjacent indicating relationship. The electrical circuitry may be contained within the housing 190 as, for example, by mounting on such as braces 202. Thus, the contactor panel 14, master card 120 and buss matrix panel 12 may be supported therein extending contacts 144 and sensor panel 16 adjacent to end slot 204 wherein successive coded playing cards can be received for the sensing operation.

As previously stated, the master card 120 may be slid endwise in between buss matrix panel 12 and contactor panel 14, or the housing 192 could be constructed with hinges such that an upper portion or panel could be rotationally moved upward with placement of master card 120 down upon contactor panel 14. While FIG. 1 shows four lamps for each card hand indicator 20 it should be understood that various means may be employed to combine the illumination indication to prevent suit-reading by the less scrupulous participants. For example, it is contemplated that four-filament lamps be employed, or that an intervening control relay be used, or that a single refracting reflector be placed over the plurality of uniformly situated lamps representing each card hand so that a single illumination is apparent for any suit of a given hand. Also, it should be understood that great economics can be effected by coding only three of the four card hands for positive indication or response, a negative response or void denoting the fourth, uncoded hand.

Figure 8:
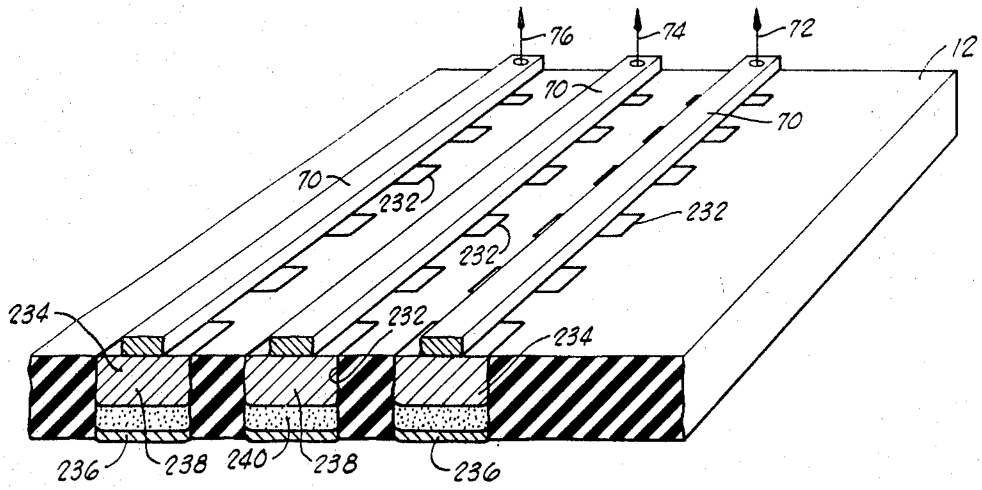
FIG. 8 is an enlarged cross section of one form of buss matrix construction.

FIG. 8 illustrates one manner of construction of the buss matrix panel 12 so that each conductor bar 70 extends a plurality of equispaced, separate rectifying contacts downward for interaction with master card 120 and contactor panel 14. Thus, buss matrix panel 12 may consist of an insulative panel 230 having a plurality of holes 232 formed therein, i.e., sixteen rows of thirteen equispaced holes 232 which can align with the plurality of locations 128 on master card 120. Each of the holes 232 then includes a suitable diode device 234 securely held therein and in current coupling connection with a metallic contact 236 secured on the bottom for conduction through contactors 114 of contactor panel 14.

The individual rectifiers 234 may be formed by any of various cladding and thin film processes such as the more recent sputtercoating and others of the semiconductor and integrated circuit techniques. For example, each of the rectifiers 234 may be formed by serial deposition of copper 238 and a barrier layer of cuprous oxide 240. A contacting shoe 242 formed of Nickel or such is then secured across the bottom of each cuprous oxide layer 240. Similarly, rectifying combinations of magnesium-copper sulphide, selenium and still other semiconductors rectifiers may be utilized. Thus, various forms of monocrystalline junction type diodes such as the silicon p-n junction type may be readily utilized.

Figure 9:
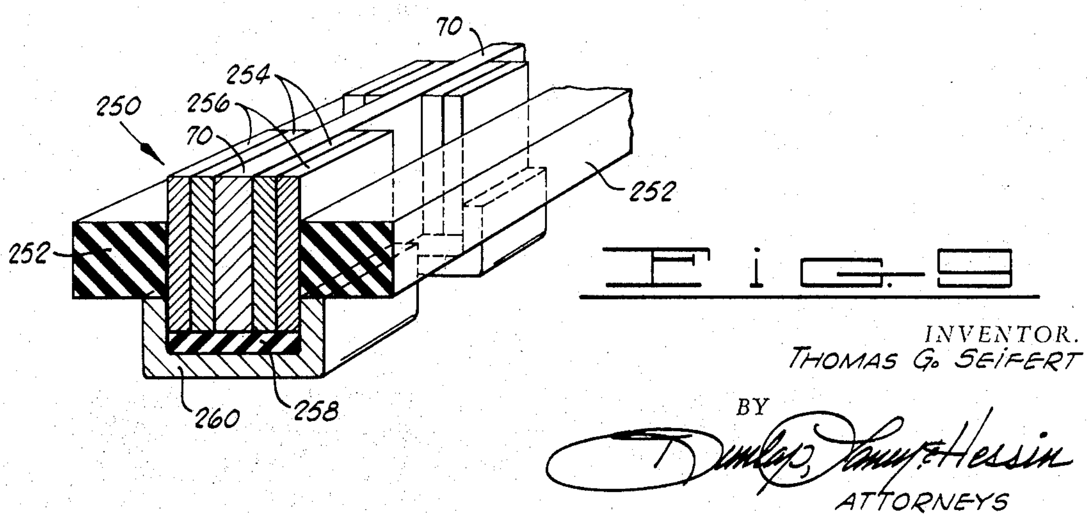
FIG. 9 is an enlarged cross section of an alternative form of buss matrix construction.

FIG. 9 depicts a form of rectifier construction which is utilized where the amount of current and, therefore, the contacting area becomes a factor. Each conductor bar 70 is supported by plural rectifier assemblies 250, each of which are interconnected by insulative spacers 252 thereby to make up the buss matrix panel 12. For each rectifier assembly 250, the conductor bar 70 is in contact with a pair of copper oxide barrier wafers 254 which, in turn, are connected to a pair of nickel-plated conductive wafers 256. The wafers 254 and 256 with conductor bar 70 are then supported on an insulator strip 258 which receives a conductive shoe 260 thereover in electrical contact only with conductive wafers 256. The shoe 260 may be a clip-on assembly formed from brass or similar metal stock. Such rectifier assemblies 250 isolate each of the contactors 114 along each row or conductor bar 70 so that all possible sneak circuits are avoided. The polarity of rectifier assemblies 250 is immaterial so long as it is consonant with polarity of batteries 22–28, and it is only necessary to maintain a current flow unidirectional.

OPERATION

The operation of the apparatus will also be described with particular reference to a four player or four handed game such as bridge. The coded master card 120 (FIG. 2) is first selected for insertion to control the electrical circuitry 10. The master card 120 may contain coded information relative to predetermined classic bridge hands along with appropriate comments. In some cases it may be desirable to enlist a group of bridge situations as derived from tournament play, this is particularly desirable from the standpoint of duplicate bridge scoring. On the other hand, a person may punch his own master cards in accordance with particularly interesting hands as personally encontered or as obtained from newspaper reprints and such.

Insertion of the master card 120 between contactor panel 14 and buss matrix panel 12 establishes a circuit for each card rank and suit which will illuminate a proper hand indicator (North, East, South or West) when the particular playing card is inserted between sensor panel 16 and shorting bar 146 to enable the predetermined battery or suit power source 22, 24, 26 or 28. Thus, as shown in FIG. 2, fifty-two holes 142 will be punched in certain of the locations 128, thirteen holes 142 in predetermined placement in each of the four column groups 134, 136, 138 and 140, each containing fifty-two locations 128.

The dealer can then take the deck of playing cards, insuring that all coded sides are properly oriented by the matching or alignment of such as corner clip portion 182. The playing cards 170 can then be slipped one at a time into end slot 204 of housing 190 (FIG. 5) between the plurality of contacts 144 and the shorting bar 146 to make its shorting circuit between whatever its suit conductor 156, 158, 160, or 162 and a card rank contactor strip 112. In the case shown, the card of FIG. 4 is the ace of hearts, code holes 178 and 180 being disposed as illustrated such that shorting bar 146 contacts through hole 178 to the heart contact 152 and wire 160 to the heart power source 24 while the shorting bar 146 also contacts through rank hole 180 to the ace rank contactor strip 112 of contactor panel 14.

Thus, and referring to the master card 120 of FIG. 2, the only contact between buss matrix panel 12 and ace rank contactor strip 112 is a unidirectional current flow through the code hole 142, the seventh column from the right and lying within the group 136 of four rows of South hand code locations. Contact will then be made through hole 142 and a rectifier 71 (FIG. 7) to the seventh conductor bar 70 from the right hand side of buss panel 12 and this conductor 70 is in turn connected to lead 86 through the South hand indicator lamp 54 and lead 50 to the positive side of heart battery 25. A complete circuit is thus made by virtue of card 170 (FIG. 4) to light lamp 54 indicating that the particular card, the ace of hearts, should go to the South hand. Thereafter, the card 170 is withdrawn from the end slide 204 or whatever the sensing design for deposit in a designated place such as the depression 198 marked by South hand indicator 20 of the apparatus 190.

ALTERNATIVE EMBODIMENT

Figure 6:
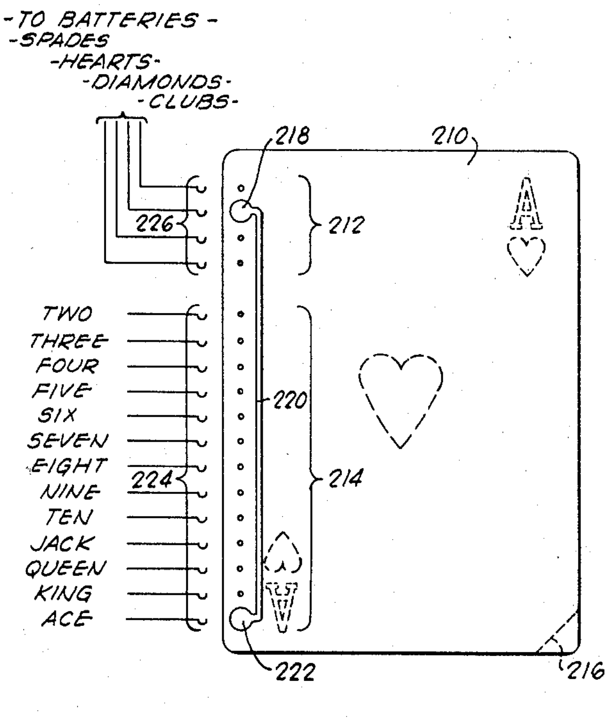
FIG. 6 illustrates an alternative form of playing card sensing mechanism and the associated code arrangement.

FIG. 6 shows an alternative form of coded playing card and the attendant sensing hardware. A playing card 210, again the ace of hearts and being depicted face down, is made to have the same similarly disposed four suit locations 202 and thirteen rank locations 214 all arranged in a row at the left edge of card 210. A corner clip 216 may be employed for the purpose of keeping the coded cards properly aligned. Punched holes are not employed in FIG. 6 and therefore such as the shorting bar 146 (FIG. 1) is unnecessary since a printed circuit connection is employed. That is, in the case of the ace of hearts, a printed circuit consisting of a card suit contactor portion 218, a conductor portion 220 and a rank contact portion 222 are formed on the playing card 210, such configuration representing an ace of hearts circuit. The plurality of spring-like contactors, thirteen rank contactors 224 and four suit contactors 226 may be employed as the sensing hardware for completing a circuit between a predetermined suit battery, in this case hearts, and the ace rank circuit for the ace contactor strip 112 of contactor panel 14.

Various other forms of coding may be employed and, in the case of printed circuits, recent techniques will allow practically invisible coding of playing cards to thereby eliminate any possibilities of card reading by opponents. In other cases where card coding is visible, the fact that code indicia are located on the left hand side of the individual playing cards conceals the code indications from an opponent's view due to the manner in which the fanned card hand is held. If desired, an extra blank playing card may be supplied for the purpose of holding it over the last card in the hand to provide complete concealment of all code indicia. It may also be desirable to provide a blank card or other such baffle or isolation member to prohibit the reading of code indicia from dealt cards as they lay in their respective hand receptacles awaiting play.

The foregoing discloses a novel sensing circuitry for use in card dealing apparatus which allows such a device to be manufactured more reliably and at much less expense. The simplicity of the circuitry enables the construction of a compact device with a minimum of wiring and interconnection being necessary, the simplicity of the unit insuring positive and rapid operation. Thus, the unit lends itself to more conventional design practices and avoids the more complex switching or contacting mechanisms which have been found to be necessary in previously constructed apparatus of similar nature.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A device for dealing playing cards in a predetermined destribution, comprising:
- plural power sources representing card suits each connected to provide a separate output;
- a plurality of groups of plural indicators which represent a selected card hand and are connected to each of said separate outputs;
- plural conductor bars disposed in parallel, each being connected in series with one of said plural indicators representing a selected card hand, said plural conductor bars being affixed upon a panel of insulating material in equispaced, parallel placement and including a plurality of rectifier means formed integrally with said insulating material and being connected in like polarity between each conductor bar and a selected one of said plural contactors;
- plural contactor strip means disposed in parallel and perpendicular to said conductor bars, each contactor strip means representing a preselected card rank;
- plural contactors disposed along each of said contactor strip means, each similar contactor of each strip means being disposed for contact with one of said conductor bars representing a card hand;
- sensor means having an additional card rank contactor electrically connected to each of said contactor strip means and four card suit contactors, said suit contactors each being connected back to the respective one of said plural power sources;
- master card means including coded indicia which is insertable between said contactor strip means and said plural conductor bars to complete only predetermined connections between said conductor bars representing card hand and said contactors representing card rank;
- playing cards each bearing code indicia representative of their respective card rank and suit to effect predetermined conduction between one of said additional card rank contactors and one of said card suit contactors to complete a circuit to a selected suit representative power source thus energizing an indicator representing a selected card hand.

2. A device as set forth in claim 1 wherein said contactor strip means and said plural contactors comprise:
- a contactor panel means formed of insulative material;
- a plurality of contactor strips supported thereon in parallel relationship, one strip for each card rank; and
- a plurality of equispaced contactors disposed along each of said contactor strips, said respective contactors of each contactor strip forming a linear row for contact with a respective one of said conductor bars which represent a card hand.

3. A device as set forth in claim 1 wherein said master card means comprises:
- a card portion bearing two hundred and eight code locations arrayed in a number of rows equal to said rows of contactor strip means, and a number of columns equal to the number of said contactors which are disposed along each of said contactor strip means.

4. A device as set forth in claim 1 wherein said playing cards each bearing code indicia comprise:
- seventeen code locations in linear array along one edge of said playing card to represent four suit locations and thirteen card rank locations; and
- code indicia represented as a code hole placed at the respective card suit and card rank locations indicative of the particular playing card.

5. A device as set forth in claim 4 wherein said sensor means comprises:
- a sensor panel bearing said additional card rank contactors and said four card suit contactors in linear array and spaced to coincide with said seventeen code locations; and
- a shorting bar disposed parallel to and in contacting relationship with said additional card rank contactors and said four card suit contactors.

6. A device as set forth in claim 1 wherein said playing cards each bearing code indicia comprise:
- playing cards bearing four card suit and thirteen card rank code locations in linear alignment along one edge of the playing card; and
- code indicia on each card which consists of printed conductive material from a card suit code location to a card rank code location which identifies the particular playing card.

7. A device for effecting predetermined distribution of playing cards, comprising:
- an electrical power source including four leads separately energizable to represent one of four card suits;
- a plurality of indicators;
- plural groups of four connectors completing circuits between each of said four leads and four of said indicators representative of different card hands;
- a plurality of conductor bars each connected in series with one of said indicators and each of said plurality of conductor bars being affixed on an insulative panel and conductively connected to plural rectifier means which are formed integrally with said insulative panel, said conductor bar being affixed on said insulative panel in plural rows having a plurality of rectifier assemblies formed in the insulative panel along each row, each of said rectifiers having one pole connected to a conductor bar with the other pole disposed as a contact surface on the opposite side of said insulative panel;

first contact means including a plurality of contactor strips each having plural contactors equispaced therealong, said first contact means being positioned adjacent to and in contacting proximity to said plurality of contact surfaces on the opposite side of the insulative panel, each of said plurality of contactor strips representing a card rank and said plural contactors representing predetermined card hands;

master card means for insertion between said conductor bars and said first contact means to enable conduction through a predetermined contactor of one of said contactor strips to one of said plural conductor bars;

second contact means having a sensing contactor for each card rank, each sensing contactor being connected to a respective one of the card rank contactor strips of said first contact means, said second contact means having four additional sensing contactors which represent card suits and are connected to said electrical power source; and playing card means bearing code indicia for insertion into contact with said second contact means to permit conduction between predetermined ones of said card suit sensing contactors and the card rank sensing contactors.

8. A device as set forth in claim 7 wherein said master card means comprises:

a card portion bearing two hundred and eight code locations which are arrayed in a number of rows equal to said number of contactor strips and a number of columns equal to the number of contactors which are disposed along each of said contactor strips, fifty-two of said code locations being actuable to enable said conduction for a predetermined card hand distribution.

9. A device as set forth in claim 7 wherein said playing card means each bearing code indicia comprise:

seventeen code locations in linear array along one edge of said playing card to represent four suit locations and thirteen card rank locations; and code indicia represented as a code hole placed at the respective card suit and card rank locations whch indicate any particular playing card.

10. A device as set forth in claim 9 wherein said second contact means comprises:

a sensor panel bearing said card rank sensing contactor and said additional card suit sensing contactors in linear array and spaced to coincide with said seventeen code locations; and a shorting bar disposed parallel to and in contacting relationship with said sensing contactors.

11. A device as set forth in claim 7 wherein said playing card means each bearing code indicia comprise:

playing cards bearing four card suit and thirteen card rank code locations in linear alignment along one edge of the playing card; and code indicia on each card in the form of printed conductive material from a card suit code location to a card rank code location which identifies the particular playing card.

References Cited

UNITED STATES PATENTS

| | | |
|---|---|---|
| 2,023,210 | 12/1935 | Potter. |
| 2,051,615 | 8/1936 | Miles. |
| 3,186,111 | 6/1965 | Lawlor. |
| 3,222,071 | 12/1965 | Lang. |
| 3,223,416 | 12/1965 | Blewitt. |

ANTON O. OECHSLE, Primary Examiner

U.S. Cl. X.R.

209—81, 110